(12) United States Patent
Akamatsu et al.

(10) Patent No.: US 7,072,486 B1
(45) Date of Patent: Jul. 4, 2006

(54) METHOD AND APPARATUS FOR ESTIMATION OF IMAGE MAGNIFICATION LEVELS

(75) Inventors: Manabu Akamatsu, Kanagawa (JP); Kenichi Takahashi, Kanagawa (JP); Yoshinori Awata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 669 days.

(21) Appl. No.: 09/659,566

(22) Filed: Sep. 11, 2000

(30) Foreign Application Priority Data

Jan. 14, 2000 (JP) ............................ 2000-006395

(51) Int. Cl.
*G06K 9/00* (2006.01)
(52) U.S. Cl. ........................................ 382/100; 382/286
(58) Field of Classification Search ................ 382/100, 382/286, 287, 291; 380/243
See application file for complete search history.

(56) References Cited

U.S. PATENT DOCUMENTS

| | | | | |
|---|---|---|---|---|
| 4,893,195 A | * | 1/1990 | Tada et al. | 358/3.26 |
| 5,539,523 A | * | 7/1996 | Nakai et al. | 358/296 |
| 5,647,010 A | * | 7/1997 | Okubo et al. | 382/100 |
| 5,752,152 A | * | 5/1998 | Gasper et al. | 399/366 |
| 5,765,089 A | * | 6/1998 | Hasuo et al. | 399/366 |
| 5,864,742 A | * | 1/1999 | Gasper et al. | 399/366 |
| 2003/0117516 A1 | * | 6/2003 | Ishida et al. | 348/348 |

FOREIGN PATENT DOCUMENTS

| | | |
|---|---|---|
| JP | 9-81729 | 3/1997 |
| JP | 10-126614 | 5/1998 |
| WO | WO 97/43736 | 11/1997 |

\* cited by examiner

*Primary Examiner*—Andrew W. Johns
*Assistant Examiner*—Patrick Edwards
(74) *Attorney, Agent, or Firm*—Morgan, Lewis & Bockius LLP

(57) ABSTRACT

Disclosed is an image processing system for processing an input image containing an object image of a predetermined pattern which may have been magnified, the image processing system. The image processing system comprises: one or more characteristic quantity computing means 51A to 51D, 52 and 53 for computing a characteristic quantity representative of a characteristic of an object image possibly contained in an input image; and a plurality of magnification estimating means 61 to 63 for computing a magnification on the basis of one or more characteristic quantities computed by and output from the one or more characteristic quantity computing means 51A to 51D, 52 and 53.

20 Claims, 19 Drawing Sheets

41: CUT-OUT IMAGE AREA

43: CHARACTERISTIC QUANTITY (3) EXTRACTION AREA

44: ON/OFF EXTRACTION AREA

| MAGNIFICATION (%) | NUMBER OF DOTS (DIAMETER) |
|---|---|
| 120 | 48 |
| 115 | 46 |
| 110 | 44 |
| 105 | 42 |
| 100 | 40 |
| 95 | 38 |
| 90 | 36 |
| 85 | 34 |
| 80 | 32 |

41: CUT-OUT IMAGE AREA
42: CHARACTERISTIC QUANTITY (2) EXTRACTION AREA

| MAGNIFICATION (%) | NUMBER OF DOTS (NUMBER OF ON PIXELS) |
|---|---|
| 120 | 313 |
| 115 | 293 |
| 110 | 261 |
| 105 | 244 |
| 100 | 225 |
| 95 | 208 |
| 90 | 194 |
| 85 | 172 |
| 80 | 152 |

41: CUT-OUT IMAGE AREA
43: CHARACTERISTIC QUANTITY (3) EXTRACTION AREA
44: ON/OFF EXTRACTION AREA

| MAGNIFICATION (%) | NUMBER OF DOTS (NUMBER OF ON/OFF INVERSE PIXELS) |
|---|---|
| 120 | 524 |
| 115 | 503 |
| 110 | 482 |
| 105 | 452 |
| 100 | 431 |
| 95 | 399 |
| 90 | 351 |
| 85 | 344 |
| 80 | 338 |

METHOD AND APPARATUS FOR ESTIMATION OF IMAGE MAGNIFICATION LEVELS

BACKGROUND OF THE INVENTION

The present invention relates to an image processing system and method for detecting a specific pattern from the image data, which is read out every pixel from an original document image by an image input device, or the image data received from communication means, and an image forming apparatus.

Recently, an illegal copying preventing system is proposed and applied to image forming apparatuses, such as full-color copying machines. In the system, specific patterns, e.g., two-dimensional codes, are buried in books, important documents, securities or the like. The system recognizes this pattern to prevent the illegal copying of those books or the like, or the illegal use of them.

Generally, the copying machine reads image information on an original document located at a given position, and copies it at the size of the original or at a magnification level set by the user. Accordingly, the unit for recognizing the specific pattern in the copying machine can easily recognize whether or not input image data has been magnified, and when it is magnified, recognize a magnification level at which the input image data has been increased in size, and hence it can carry out a discriminating process on the basis of the magnification information.

A printer, unlike the copying machine, is connected to an external machine, e.g., a personal computer (abbreviated simply as a PC), and receives image data to be output from the external machine. Let us consider a case where an original document containing a specific pattern buried therein in advance is read by an image reader, such as a scanner, the image data read out is loaded into the memory of the PC, the image data is magnified by several %, and the resultant data is sent to the printer. In this case, a magnification of the image data is unknown to the pattern recognizing unit in the printer. Therefore, the pattern recognizing unit will mistakenly judge that the specific pattern in the magnified image data is different in size from the specific pattern to be detected, and will fail to recognize the specific pattern of the magnified image data as the specific pattern to be detected.

To prevent such a pattern recognition failure in advance, there are known magnification-estimating techniques, which are employed for an image recognition device for recognizing the specific pattern (the Unexamined Japanese Patent Application Publication No. Hei 9-81729 and the Unexamined Japanese Patent Application Publication No. Hei 10-126614). The technique disclosed in the publication of the Unexamined Japanese Patent Application Publication No. Hei 9-81729 uses a plurality of matching reference images, such as an image having an average or typical characteristic of a specific pattern to be recognized, an image having a maximum characteristic, and an image having a minimum characteristic. The technique carries out a process of matching of an object image to be matched against the reference images to obtain a position where a peak degree of matching and degrees of matching of the object image. The technique carries out an interpolation process using the results of the matching process to produce a magnification of the object image.

The technique of the publication of the Unexamined Japanese Patent Application Publication No. Hei 10-126614 first detects a given mark contained in input image data, and then estimates a magnification given to the input image data on the basis of the size of the mark. The technique carries out a process of normalizing the input image on the basis of the estimated magnification, and compares the result of the normalization with reference data to discriminate whether or not an object image is contained in the input image.

The technique of the publication of the Unexamined Japanese Patent Application Publication No. Hei 9-81729 cannot handle the object images of patterns other than a circular pattern, however. There are cases that a pattern of the object image is not circular, that the object image is circular in pattern but the area within the circular contour contains complex patterns, and that an image intentionally rotated is input. To cope with such, a matching process is needed for the rotated image. To realize the matching process for the rotated image by a hardware technique, a circuit for executing the matching process will be large in circuit scale. To realize the matching process for the rotated image by a software technique, a fairly large amount of calculations will be required.

In the technique of the publication of the Unexamined Japanese Patent Application Publication No. Hei 10-126614, as described above, complicated steps are required for the process to judge whether or not an object image is contained in the object image. Accordingly, the technique needs a complex process.

Further, to judge whether or not an object image is present in the input image, the input image or the image internally processed is temporarily stored in a memory. To this end, a large memory will be used indispensably.

SUMMARY OF THE INVENTION

Accordingly, an object of the present invention is to provide an image processing system and method which can discriminate a specific pattern to be recognized in an input image whose magnification is unknown, by use of a less amount of memory, and simple construction and process, and an image forming apparatus for making an image containing a specific pattern invalid.

The present invention provides an image processing system for processing an input image containing an object image of a predetermined pattern which may have been magnified, the image processing system, as shown in FIG. 21, comprising:

one or more characteristic quantity computing means for computing a characteristic quantity representative of a characteristic of an object image possibly contained in an input image; and a plurality of magnification estimating means for computing a magnification on the basis of one or more characteristic quantities computed by and output from the one or more characteristic quantity computing means. The image processing system further comprises judging means for judging whether or not the object image is present in the input image, from the plurality of magnification levels estimated by the plurality of magnification estimating means. With this feature, even in a case where an object image having been magnified is contained in the input image, the image processing system reliably detects the object image.

In the image processing system, the judging means, as shown in FIG. 22, may judge whether or not the object image is present in the input image, from one or more characteristic quantities computed by the one or more characteristic quantity computing means and a plurality of magnification levels estimated by the plurality of magnification estimating means. With this feature, even in a case where an object image having been magnified is contained in the input image, the image processing system reliably detects the object image.

The image processing apparatus or method thus constructed may be incorporated into an image forming apparatus. When an object image is present in the input image data, the image forming apparatus reliably is capable of making the image data invalid.

Thus, the image forming apparatus can exactly judge whether or not the object image is present even if it has been magnified. Accordingly, the image forming apparatus can reliably make the image data containing the object image invalid.

DETAILED DESCRIPTION OF THE PREFERRED EMBODIMENTS

Figure 1:
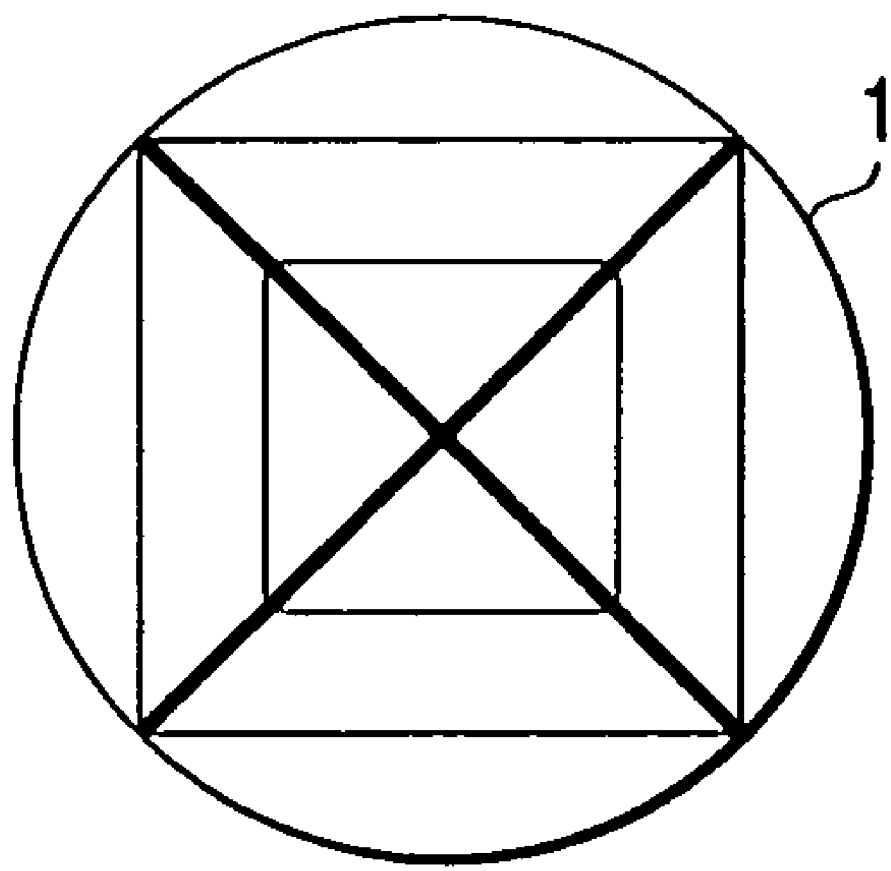
FIG. 1 is an explanatory diagram showing an object image to be recognized in the embodiments of the present invention.

An image to be recognized in an embodiment of the present invention is an object image shown in FIG. 1. The object image designated by reference numeral 1 consists of a circle and patterns located within the circle. The diameter of the circle of the object image is 10 mm in a state that the object image is not magnified or its magnification is 100%. It is readily understood that the object image 1 is not limited to the illustrated one but its shape and size are appropriately selected upon occasion.

Figure 2:
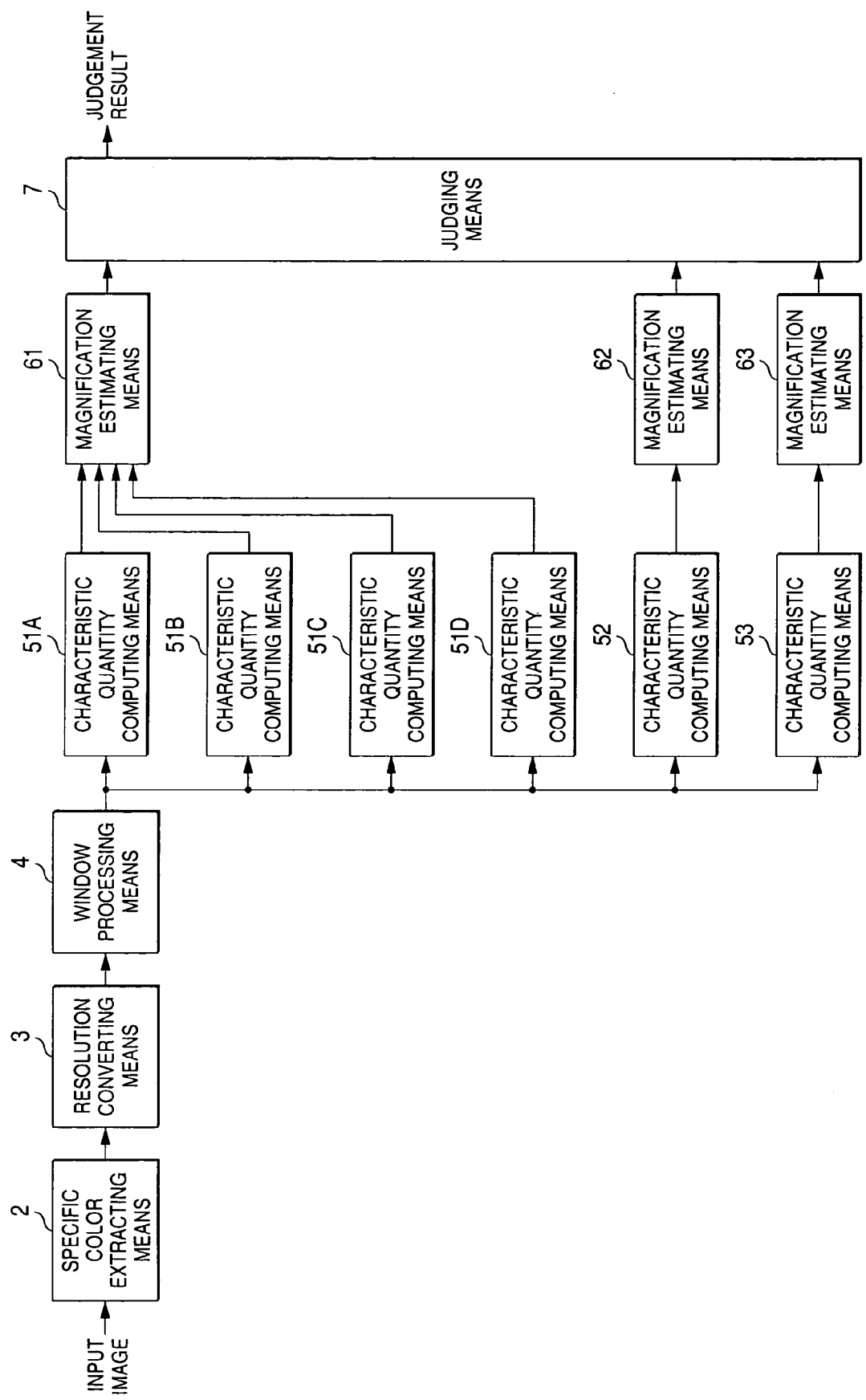
FIG. 2 is a block diagram showing an overall arrangement of an image processing system which is an embodiment of the present invention.

FIG. 2 is a block diagram showing an overall arrangement of an image processing system which is an embodiment of the present invention. In the figure, reference numeral 2 is specific color extracting means; 3 is resolution converting means; 4 is window processing means; 51 to 53 are characteristic quantity computing means 61 to 63 are magnification estimating means; and 7 is judging means.

The specific color extracting means 2 extracts only a preset color from an input image. The resolution converting means 3 reduces a resolution of the input image from which the specific color was extracted by the specific color extracting means 2. In a specific example, the resolution converting means 3 is capable of reducing 600 dpi of the input image to about 100 dpi. Where the resolution is converted into 100 dpi, the diameter of the object image 1 is 40 dots when the magnification is 100%.

With provision of the specific color extracting means 2 and the resolution converting means 3, the image data to be processed may be reduced in size. The size reduction of the image data will lessen the load in the subsequent process. If required, the specific color extracting means 2 and/or resolution converting means 3 may be omitted, as a matter of course.

Figures 3, 4:
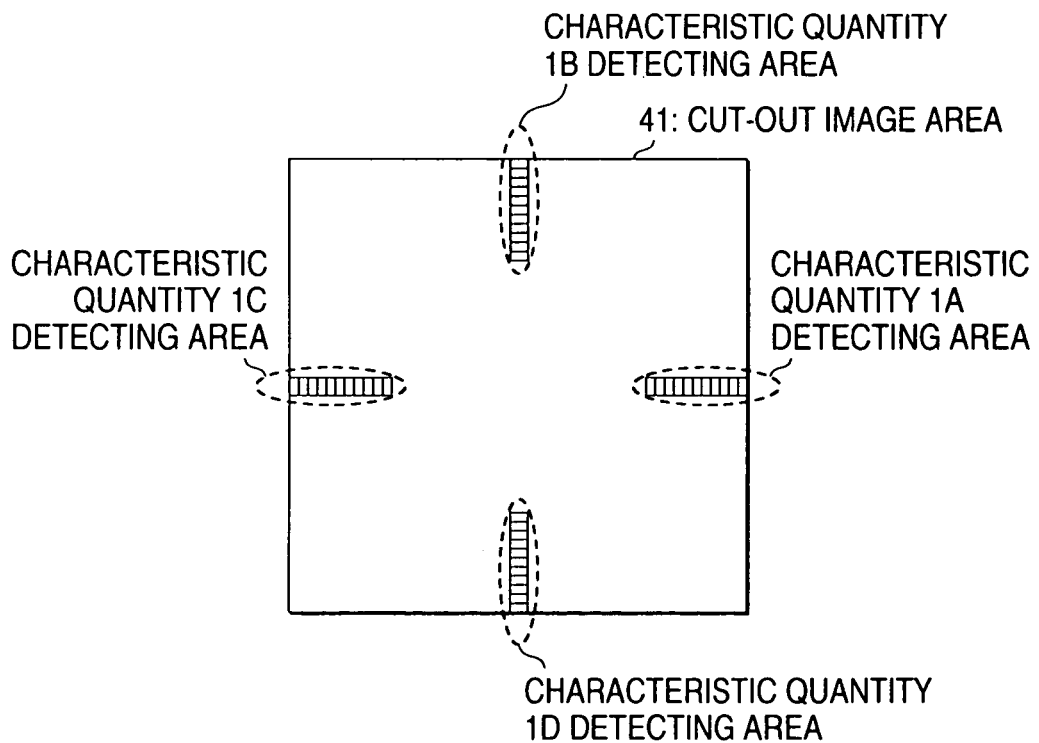
FIG. 3 is a table showing a relationship between the size of the object image having undergone the resolution conversion, and the magnification.
FIG. 4 is a diagram showing a cut-out image area and characteristic quantity (1) detecting areas for a characteristic quantity (1).

The window processing means 4 sequentially cuts a predetermined image area out of the image of which the resolution was reduced by the resolution converting means 3, and produces cut-out image areas. FIG. 3 is a table showing a relationship between the size of the object image 1 having undergone the resolution conversion, and the magnification. In case that an input image of 600 dpi in resolution, which contains an object image 1 not magnified, is input to the image processing system, and that the resolution of the input image is converted into 100 dpi, the object image 1 takes the form of a circle of about 40 dots in diameter.

When an input image containing the object image 1 having been increased or decreased in size is input to the image processing system, the object image 1 has the diameter which depends on the magnification as shown in FIG. 3. Accordingly, one may determine the size of the cut-out image area, which is cut out by the window processing means 4, while referring to the table.

As seen from the table, when the magnification is 120%, the diameter of the object image 1 is 48 dots. The cut-out image area is selected to have 48 dots×48 dots. Thus, in this instance, the cut-out image area is a square of 48×48. However, the size and shape of the cut-out image area may be appropriately selected as needed. For example, the cut-out image area may be analogous in shape to the object image 1. In this instance, the magnification is selected to be within a range of 80% to 120%. The magnification varying range may be broader than this range, if required.

The characteristic quantity computing means 51A to 51D, and the characteristic quantity computing means 52 and 53 each detect or compute something (referred to merely as "characteristic quantity") representative of a characteristic of the object image 1. In this instance, as will be described later, those characteristic quantity computing means detect or compute a total of six characteristic quantities; peripheral information at four positions as characteristic quantities representing a shape of the object image 1, and ON pixel information and ON/OFF inverse information, which represent the inner patterns of the object image 1. Specifically, the characteristic quantity computing means 51A to 51D detect the peripheral information of the object image 1, the characteristic quantity computing means 52 detects the ON pixel information, and the characteristic quantity computing means 53 detects the ON/OFF inverse information.

While six characteristic quantities are detected or computed in this instance, the characteristic quantity may take any form if it represents a characteristic of the object image. The number of the characteristic quantities may also be selected appropriately.

The characteristic quantities (characteristic quantities 1A to 1D), which are detected by the characteristic quantity computing means 51A to 51D, represent a shape of the object image 1. Specifically, those characteristic quantities are ON pixel information of magnification estimating areas (1) to (9), which correspond to the magnification levels in a characteristic quantity 1A detecting area, a characteristic quantity 1B detecting area, a characteristic quantity 1C detecting area, and a characteristic quantity 1D detecting area, which will be described later in detail.

Figure 5:
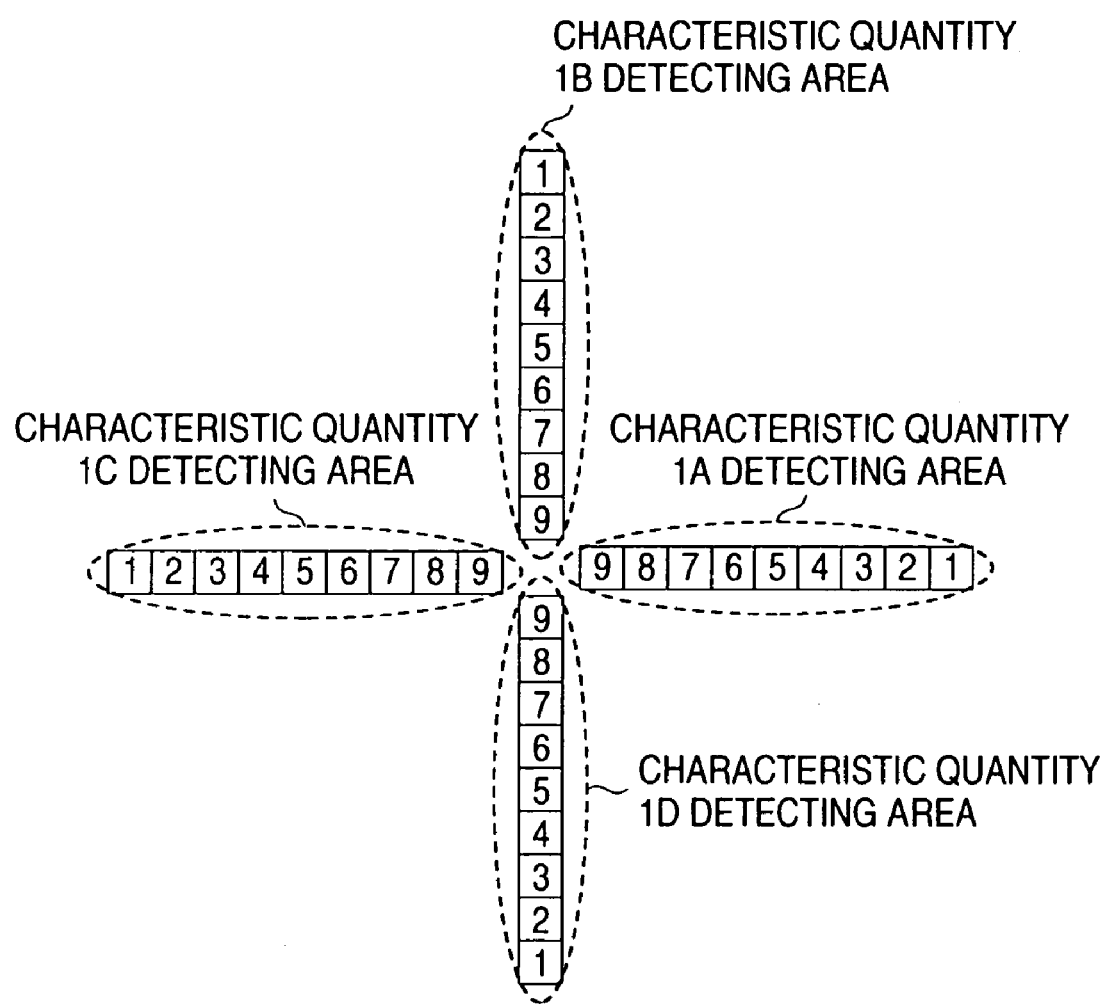
FIG. 5 is a diagram exemplarily showing characteristic quantity (1) detecting areas and magnification estimating areas for extracting characteristic quantities (1A) to (1D)

Specific examples of the characteristic quantity 1A detecting area, characteristic quantity 1B detecting area, characteristic quantity 1C detecting area, and characteristic quantity 1D detecting area, and the magnification estimating areas (1) to (9) are diagrammatically illustrated in FIGS. 4 and 5. A cut-out image area 41 shown in FIG. 4 is a cut-out image area cut out by the window processing means 4. The characteristic quantity 1A detecting area, characteristic quantity 1B detecting area, characteristic quantity 1C detecting area, and characteristic quantity 1D detecting area, which are within the cut-out image area 41, are the areas used for simply detecting the circumference of the circle of the object image. The characteristic quantity 1A detecting area and the characteristic quantity 1C detecting area are used for detecting the periphery of the circle as viewed in the fast scan direction. The characteristic quantity 1B detecting area and the characteristic quantity 1D detecting area are used for detecting the periphery of the circle in the slow scan direction.

As shown in FIG. 3, the size (diameter) of the object image 1 varies depending on the magnification. Therefore, in each of the characteristic quantity 1A detecting the area, characteristic quantity 1B detecting area, characteristic quantity 1C detecting area, and characteristic quantity 1D detecting area, the positions corresponding to the magnification levels, i.e., portions containing numerals in FIG. 5, are assigned to magnification estimating areas (1) to (9), respectively.

In this instance, the magnification estimating area (1) corresponds to the position of 120% of the magnification. Similarly, the magnification estimating areas (2), (3), (4), (5), (6), (7), (8) and (9) correspond to the positions of 115%, 110%, 105%, 100%, 95%, 90%, 85% and 80%, respectively.

Accordingly, when the object image 1 is cut out of the input image by the window processing means 4 where the characteristic quantity 1A detecting area, characteristic quantity 1B detecting area, characteristic quantity 1C detecting area, and characteristic quantity 1D detecting area, and the magnification estimating areas are set up as mentioned above, the positions on the object image 1 corresponding to magnification levels are extracted in the form of ON pixels.

In this instance, the four characteristic quantity (1) detecting areas for detecting the periphery of the object image 1 are located at four positions in the fast and slow scan directions. Those areas may be located at positions as obliquely viewed, and the number of them may be appropriately selected.

The output signals of the characteristic quantity computing means 51A to 51D are ON pixel information in the magnification estimating areas (1) to (9), which correspond to the magnification levels of the characteristic quantity 1A detecting area, characteristic quantity 1B detecting area, characteristic quantity 1C detecting area, and characteristic quantity 1D detecting area. The magnification estimating means 61 estimates a magnification of the cut-out image area 41 on the basis of the ON pixel information of the characteristic quantity computing means 51A to 51D.

Figure 6:
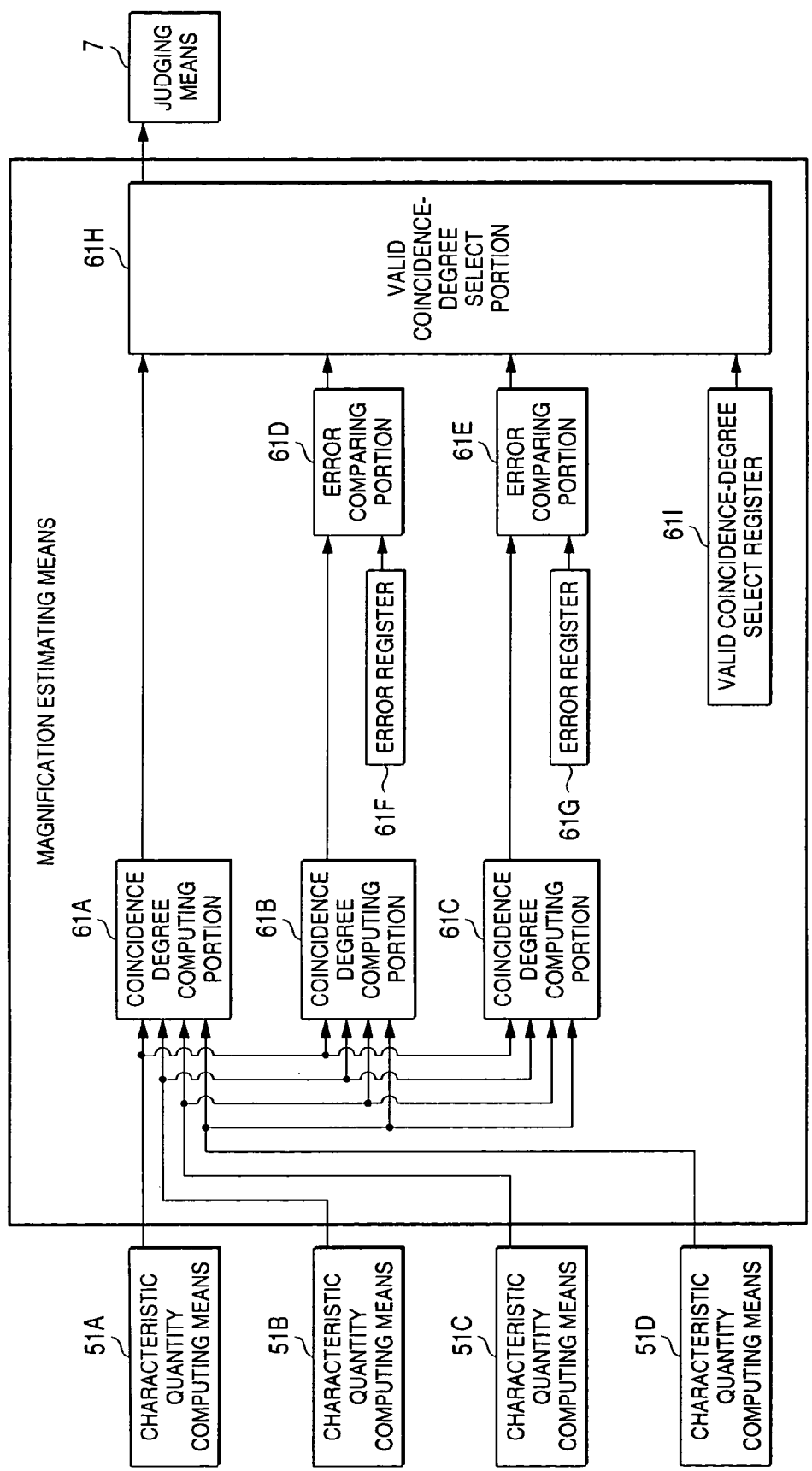
FIG. 6 is a block diagram showing an exemplar arrangement of magnification estimating means for the characteristic quantities (1A) to (1D).

FIG. 6 is a block diagram showing an exemplary arrangement of the magnification estimating means 61. In the magnification estimating means 61, signals output from the characteristic quantity computing means 51A to 51D are input to coincidence computing portions 61A to 61C, respectively. The coincidence computing portion 61A compares the ON pixel information received from the characteristic quantity computing means 51A to 51D, and checks if those four pieces of ON pixel information are coincident with one another. When those four pieces of information are coincident with one another, the ON pixel information decided to be coincident is output to a valid coincidence-degree select portion 61H.

The computing portion 61B likewise compares the ON pixel information received from the characteristic quantity computing means 51A to 51D, and checks if three of those four pieces of ON pixel information are coincident with one another. The coincidence computing portion 61C compares the ON pixel information received from the characteristic quantity computing means 51A to 51D, and checks if two of those four pieces of ON pixel information are coincident with each other.

The detect results by the computing portions 61B and 61C are respectively output to error comparing portions 61D and 61E. Each of the error comparing portions 61D and 61E computes differences or errors between the pieces of ON pixel information, which are not coincident, output from the characteristic quantity computing means 51A to 51D and the pieces of ON pixel information, which are coincident, output from the same. When the errors are within a preset range in a corresponding error register 61F, 61G or 74, when the computed errors are within the preset error range of the error register, the pieces of ON pixel information, which are coincident, are output from the computing portion 61B and the coincidence computing portion 61C to the valid coincidence-degree select portion 61H.

More specifically, it is assumed now that an error tolerable range to be set in the error register is ±5%. When the ON pixel information output from the characteristic quantity computing means 51A to 51C indicate the position of the magnification estimating area (5), i.e., 100%, and the ON pixel information from the characteristic quantity computing means 51D indicate the position of the magnification estimating area (4), i.e., 105%, the computing portion 61B detects that three pieces of ON pixel information from the characteristic quantity computing means 51A to 51D are coincident with one another, and the error comparing portion 61D compares 100% as the ON pixel information output from the characteristic quantity computing means 51A to 51C with 105% as the ON pixel information from the characteristic quantity computing means 51D. As a result, the error is 5%. As recalled, the error tolerable range set in the error register is ±5%. Therefore, 100% as the ON pixel information output from the characteristic quantity computing means 51A to 51C is output to the valid coincidence-degree select portion 61H.

The valid coincidence-degree select portion 61H determines whether or not the results output from the coincidence computing portion 61A, the error comparing portion 61D, and the error comparing portion 61E are valid, and selects the valid result with the aid of a valid coincidence-degree select register. And it outputs only the valid result to the judging means 7.

Figures 7, 8:
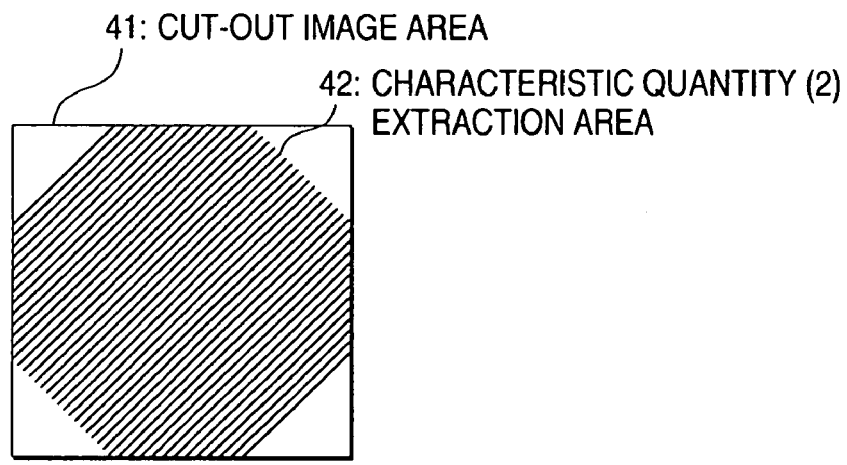
FIG. 7 is a diagram exemplarily showing an extraction area in extracting a characteristic quantity (2).
FIG. 8 is a table showing relationships between the characteristic quantity (2) and magnification levels.

Description will now be given about a process of computing the ON pixel information as a characteristic quantity (characteristic quantity (2)), which represents the inner pattern of the object image 1. The process is carried out by the characteristic quantity computing means 52. A circular area (corresponding to the object image 1 whose magnification is 120%) of 48 dots in diameter, hatched in FIG. 7, is first provided as the characteristic quantity (2) extraction area 42 within a cut-out image area 41 cut out by the window processing means 4. The characteristic quantity computing means 52 counts the ON pixels within the characteristic quantity (2) extraction area 42 for the image within the cut-out image area 41, and outputs the resultant to the area magnification estimating means 62.

The results of counting the number of the ON pixels of the object image 1, which corresponds to the magnification within the characteristic quantity (2) extraction area 42, are shown in FIG. 8. As shown in FIG. 8, the number of the ON pixels within the characteristic quantity (2) extraction area 42 varies depending on the magnification. When the object image 1 is present within the cut-out image area 41, a magnification corresponding to the object image 1 within the cut-out image area 41 cut out by the area magnification estimating means 62 can be estimated on the basis of the number of ON pixels within the characteristic quantity (2) extraction area 42, which is counted by the characteristic quantity computing means 52.

In a process of estimating a magnification corresponding to the object image 1 within the cut-out image area 41, which the process is carried out by the are magnification estimating means 62, the number of ON pixels in the object image 1 corresponding to the magnification levels within the characteristic quantity (2) extraction area 42 as shown in FIG. 8 are stored as a dictionary. The magnification is estimated while referring to the dictionary for comparison.

In another magnification estimating process, the image processing system contains a dictionary, which stores the upper limit/lower limit of the number of the ON pixels in the object image 1 corresponding to the magnification within the characteristic quantity (2) extraction area 42. When the number of ON pixels within the characteristic quantity (2) extraction area 42 is between the upper limit/the lower limits corresponding to the magnification, a magnification corresponding to the upper limit/lower limit may be estimated to be a magnification of the cut-out image area 41.

A process of computing ON/OFF inverse information as a characteristic quantity (characteristic quantity (3)), which represents the inner pattern of the object image 1, which the process is carried out by the characteristic quantity computing means 53, will be described. As in the process of computing the ON pixel information, which is carried out by the characteristic quantity computing means 52, to compute the ON/OFF inverse information, the characteristic quantity (3) extraction area is provided within the cut-out image area 41 cut out by the window processing means 4. The magnification estimating means 63 counts the inverted ON and OFF pixels in the fast and slow scan directions, and outputs the result of the counting to the magnification estimating means 63.

Figures 9, 10:
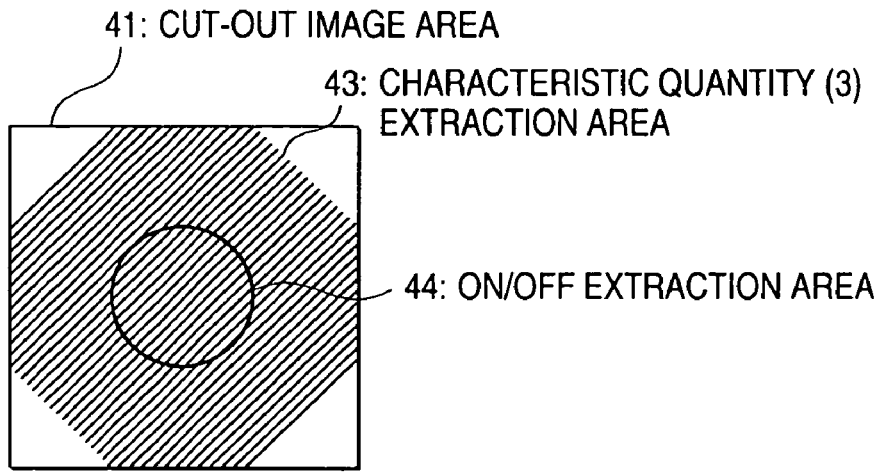
FIG. 9 is a diagram exemplarily showing an extraction area in extracting a characteristic quantity (3).
FIG. 10 is a table showing relationships between the characteristic quantity (3) and magnification levels.

In this instance, two directions, the fast and slow scan directions, are used for the direction to obtain the ON/OFF inverse information. If necessary, one or plural directions may be used for the same purpose. As shown in FIG. 9, ON and OFF pixels in an image of a predetermined shape, such as an ON/OFF extraction area 44, within a characteristic quantity (3) extraction area 43, may be counted.

FIG. 10 is a table showing the results of counting ON/OFF inverse information of the object image 1 corresponding to a magnification when the characteristic quantity (3) extraction area is changed to the characteristic quantity (2) extraction area 42. As seen from the table of FIG. 10, the number of ON/OFF inverse pixels within the characteristic quantity (2) extraction area 42 varies depending on the magnification. When an object image 1 is present within the cut-out image area 41, the magnification estimating means 63 may estimate a magnification corresponding to the object image 1 within the cut-out image area 41 on the basis of the number of ON/OFF inverse pixels within the characteristic quantity (2) extraction area 42, which is counted by the characteristic quantity computing means 53.

A process by which the magnification estimating means 63 estimates a magnification corresponding to the object image 1 within the cut-out image area 41 resembles the magnification estimating process of the magnification estimating means 62.

Figure 11:
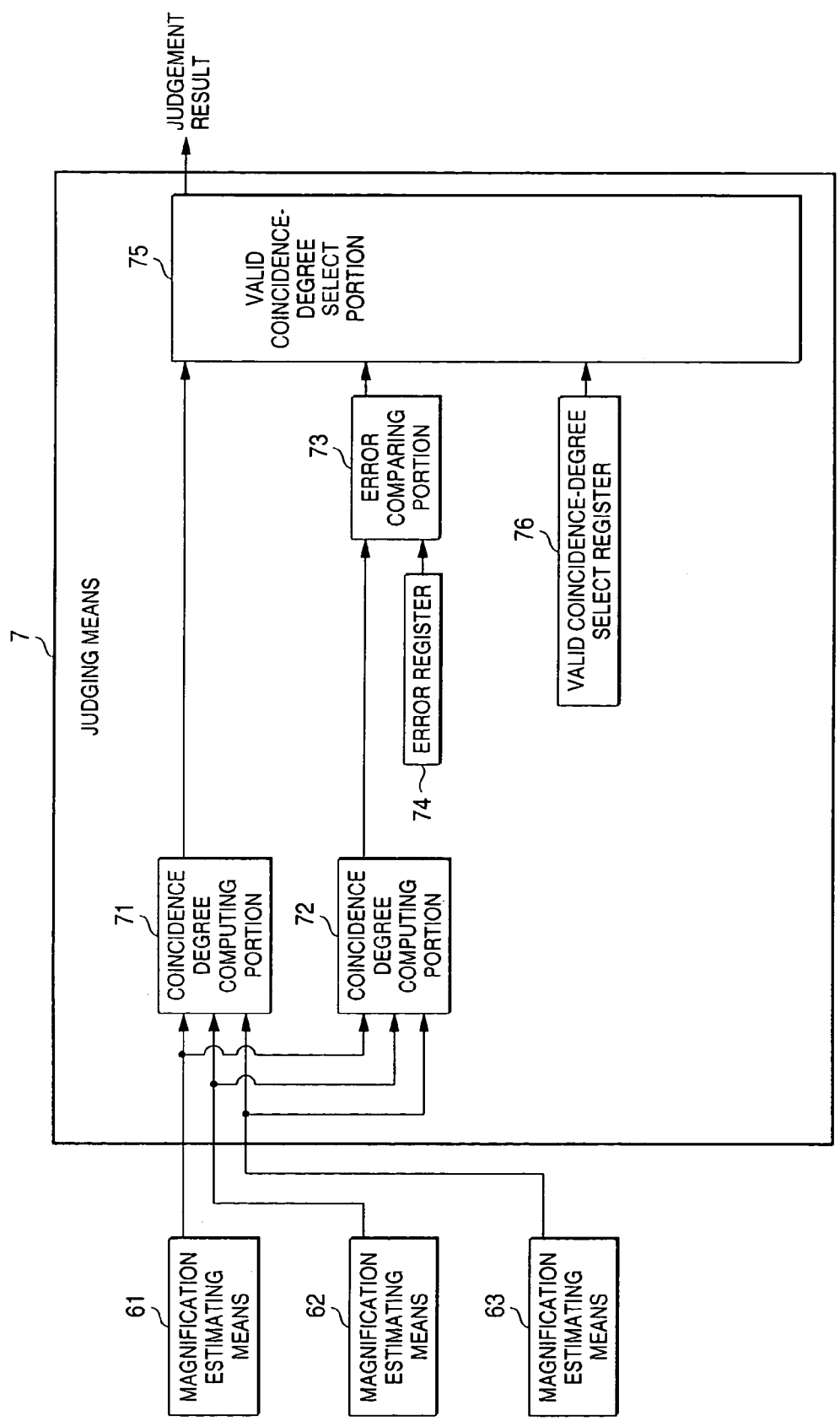
FIG. 11 is a block diagram showing an exemplary arrangement of the judging means.

A block diagram showing an exemplary arrangement of the judging means 7 is shown in FIG. 11. In the judging means 7, pieces of magnification information output from the magnification estimating means 61 to 63 are input to coincidence degree computing portions 71 and 72. The coincidence degree computing portion 71 compares the magnification information received from the magnification estimating means 61 to 63, and judges whether or not those pieces of information are coincident with one another. If the pieces of information are coincident with one another, the judging means 7 judges that the object image 1 is contained in the cut-out image area 41, and outputs the result of the judgement to a valid coincidence degree select portion 75.

Similarly, the coincidence degree computing portion 72 compares pieces of magnification information received from the magnification estimating means 61 to 63, and judges whether or not the pieces of magnification information output from the magnification estimating means 61 to 63 are coincident with one another, and outputs the result of the judgement to an error comparator portion 73.

The error comparator portion 73 computes an error or difference between the magnification information being not coincident that is output from the magnification estimating means 61 to 63 and the magnification information being coincident that is output from the magnification estimating means 61 to 63. If the computed error is within a tolerable range set in an error register, the judging means judges that the error is within the tolerable range, and that an object image 1 is present within the cut-out image area 41, and outputs the judgement result to the valid coincidence degree select portion 75.

Let us consider a case where the error tolerable range set in the error register is ±5%, and the magnification information of the magnification estimating means 61 and 62 is 100% and that of the magnification estimating means 63 is 105%. In this case, the coincidence degree computing portion 72 detects that the magnification information of the magnification estimating means 61 to 63 are coincident with one another. The error comparator portion 73 compares 100% of the magnification information of the magnification estimating means 61 and 62 with 105% of that of the magnification estimating means 63. As a result, it produces an error of 5%. This figure is within ±5%. Therefore, the judging means judges that an object image 1 is present within the cut-out image area 41, and outputs the judgement result to the valid coincidence degree select portion 75.

The valid coincidence degree select portion 75 judges whether or not the processing results output from the coincidence degree computing portion 71 and the error comparator portion 73 are valid and selects only the valid result or results with the aid of a valid coincidence degree select register 76, and outputs the valid result or results.

Figure 12:
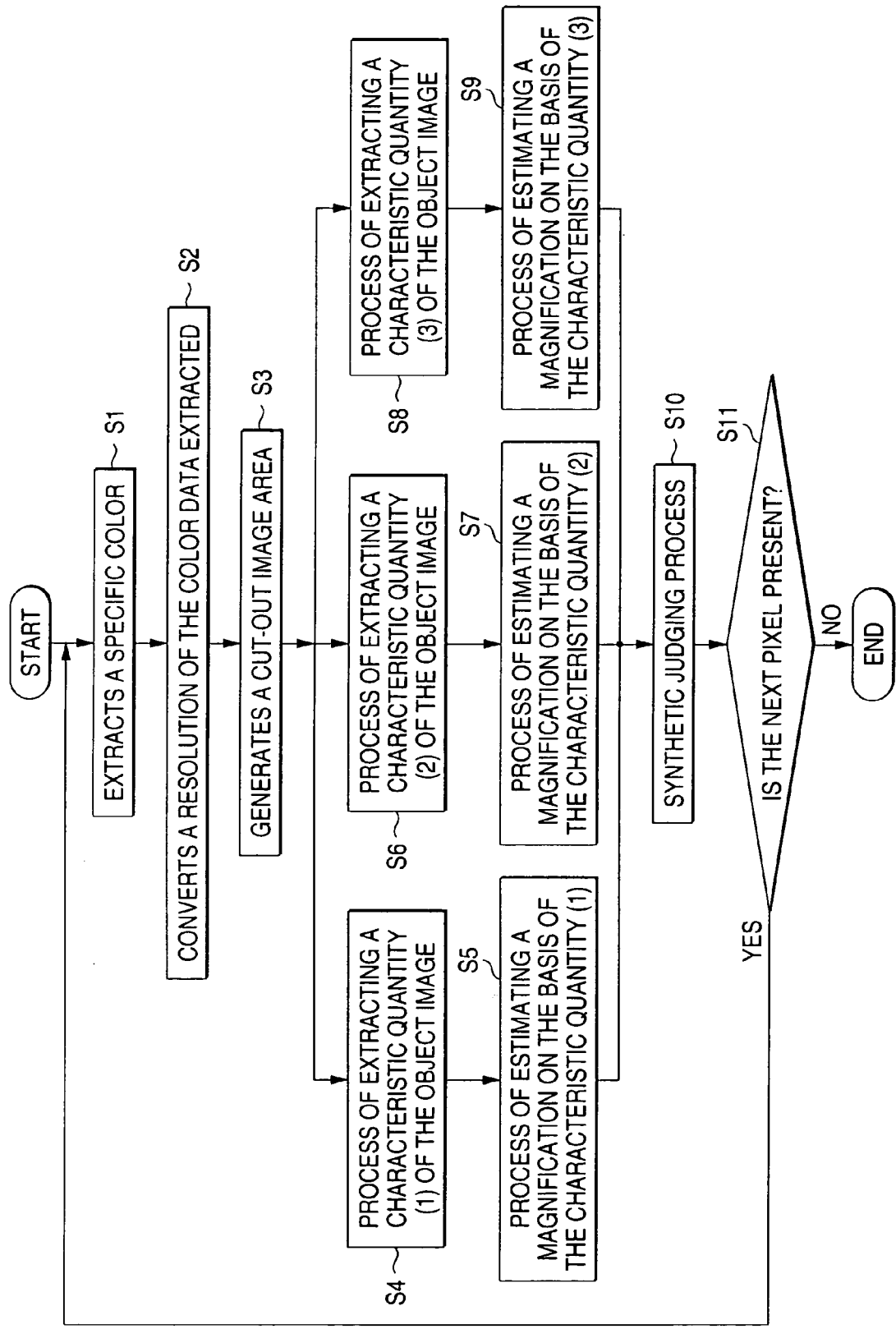
FIG. 12 is a general flow chart showing an image processing method according to the present invention.

FIG. 12 is a flow chart generally showing the image processing method of the present invention. An input image is input to the image processing system. Upon receipt of the input image, the image processing system starts an operation of detecting an object image. A step S1 is executed to extract only a predetermined color. A step S2 is executed to convert a resolution of the extracted color data extracted in the step S1 to another resolution. For example, 600 dpi is converted into 100 dip.

A step S3 is executed to cut out a cut-out image area out of the image data having undergoing the resolution conversion in the step S2. In this case, the size of the cut-out image area cut out is selected so as to allow the object image 1 of the highest magnification level to be detected. In this instance, the size of the cut-out image area is selected to be 48 dots×48 dots so as to allow the object image 1 of 120% in magnification to be detected.

A step S4 is executed to extract a characteristic quantity (1) of the object image 1 within the cut-out image area cut out in the step S3. A step S5 is executed to estimate a magnification on the basis of the characteristic quantity (1) extracted in the step S4. A step S6 is executed to extract a characteristic quantity (2) of the object image 1 within the cut-out image area cutout in the step S3. A step S7 is executed to estimate a magnification on the basis of the characteristic quantity (2) extracted in the step S6.

A step S8 is executed to extract a characteristic quantity (3) of the object image 1 within the cut-out image area cut out in the step S3. A step S9 is executed to estimate a magnification on the basis of the characteristic quantity (3) extracted in the step S9. Here, it is assumed that the characteristic quantity (1) contains the characteristic quantities 1A to 1D used in the image processing system of the embodiment. The characteristic quantities (2) and (3) are the characteristic quantities (2) and (3) used in the image processing system of the embodiment.

Figure 13:
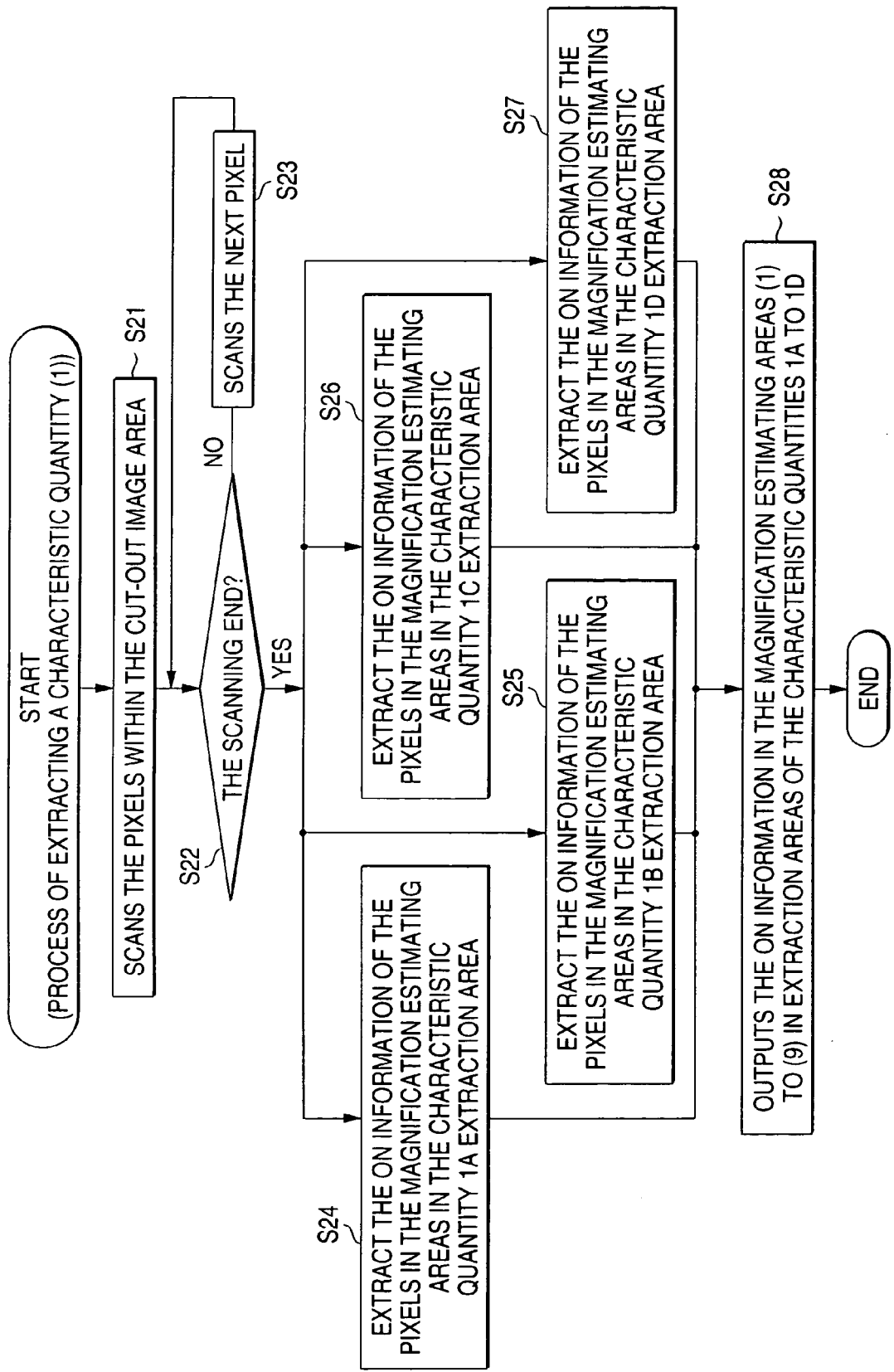
FIG. 13 is a flow chart showing a process of extracting the characteristic quantity (1).

In a step S11, it is judged whether or not a next pixel is present. FIG. 13 is a flow chart showing a process of extracting the characteristic quantity (1), which is executed in the step S4 in FIG. 12. An operation of extracting the characteristic quantity (1) starts. A step S21 is executed to scan the pixels within the cut-out image area. A step S22 is executed to check if all the pixels have been scanned. If all the pixels are not scanned, a step S23 is executed to scan the subsequent pixels. The scanning operation is repeated until all the pixels are scanned.

After all the pixels with the cut-out image area are scanned, a step S24 is executed to extract the ON information of the pixels in the magnification estimating areas (1) to (9) in the characteristic quantity 1A extraction area (FIG. 5). Steps S25, S26 and S27, respectively, extract the ON information of the pixels in the magnification estimating areas (1) to (9) in the characteristic quantity 1B extraction area, the characteristic quantity 1C extraction area, and the characteristic quantity 1D extraction area (FIG. 5). A step. S28 outputs the ON information in the magnification estimating areas in the characteristic quantity 1A extraction area, the characteristic quantity 1B extraction area, and the characteristic quantity 1C extraction area, and the characteristic quantity 1D extraction area, which are extracted in the steps S24 to S27, and the process of extracting the characteristic quantity (1) ends.

Figure 14:
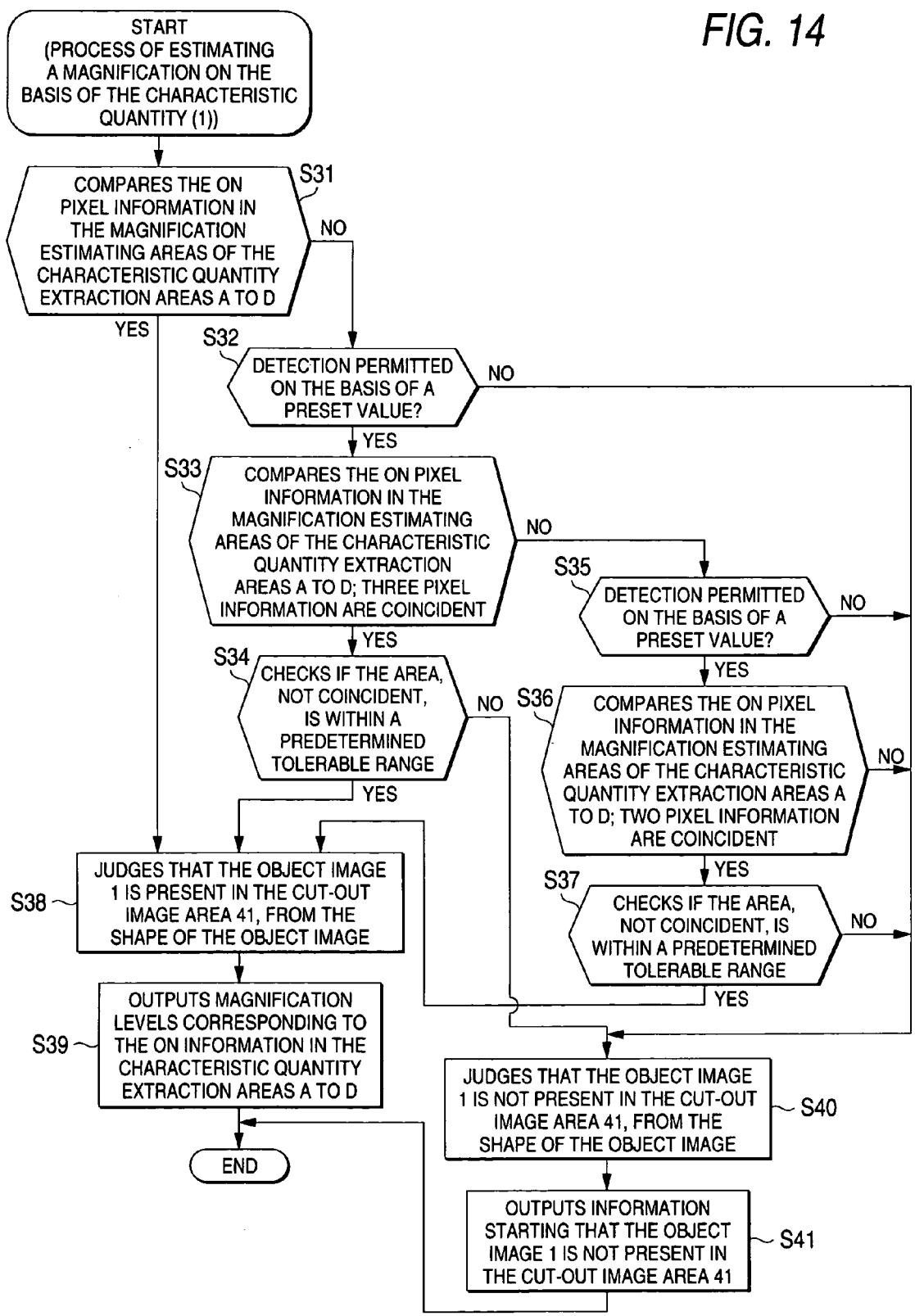
FIG. 14 is a flow chart showing a process of estimating a magnification on the basis of the characteristic quantity (1).

FIG. 14 is a flow chart showing a process of estimating a magnification on the basis of the characteristic quantity (1) in the step S5 in FIG. 12. An operation of estimating a magnification on the basis of the characteristic quantity (1) starts. A step S31 is executed to compare the ON pixel information in the characteristic quantity (1) extraction areas A to D, extracted in the step S4 (FIG. 12). When all the comparing results are coincident with one another, a step S38 is executed. When the results are not coincident, a step S32 is executed.

When a detection is permitted on the basis of a preset value in the step S32, a step S33 is executed to compare the ON pixel information of the characteristic quantity (1) extraction areas A to D, extracted in the step S4 (FIG. 12). When three comparing results are coincident with one another, a step S34 is executed to check if the area not coincident is within a predetermined tolerable range. When it is within the predetermined range, a step S38 is executed. In other cases, a step S40 is executed. This step judges that the image within the cut-out image area 41 is not the object image 1, from the shape of the object image 1. A step S41 is executed to output information stating that the image within the cut-out image area 41 is not the object image 1, and the process under execution ends.

When three comparing results are not coincident with one another in the step S33, a step S35 is executed. When a detection is permitted on the basis of a preset value in the step S35, a step S34 is executed to compare the ON pixel information in the characteristic quantity (1) extraction areas A to D, extracted in the step S4 (FIG. 12). When two of the comparing results are coincident with each other, a step S37 is executed to check the areas not coincident are within a predetermined error range. When those are within the error range, a step S38 is executed. In other cases, a step s40 is executed to judge that the image within the cut-out image area 41 is not the object image 1, from the shape of the object image 1, and then a step s41 is executed to output information stating that the image within the cut-out image area 41 is not the object image 1, and this process under execution ends.

The step S38 judges that the image within the cut-out image area 41 is the object image 1, from the shape of the object image 1, and a step S39 is executed to output magnification levels of the characteristic quantity (1) extraction areas A to D, obtained in the step S4, and the process under execution ends.

Figure 15:
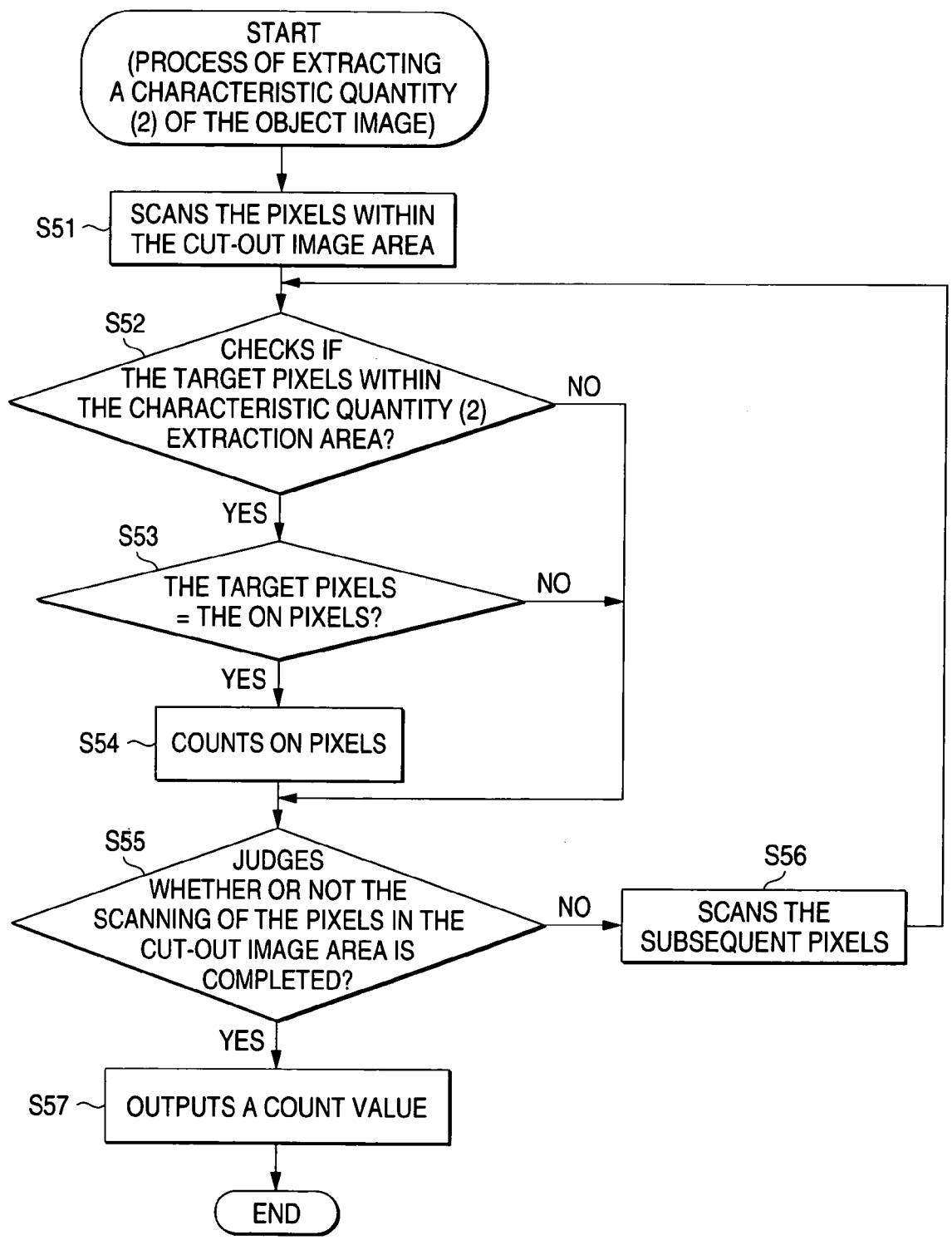
FIG. 15 is a flow chart showing a process of extracting the characteristic quantity (2).

A process of extracting the characteristic quantity (2) in the cut-out image area cut out in the step S3, which is executed in the step S6 in FIG. 12, is a flow charted chart in FIG. 15. An operation of extracting the characteristic quantity (2) starts. Then, a step S51 is executed to scan the pixels within the cut-out image area. A step S52 is executed to judge whether or not target pixels to be scanned are present within a characteristic quantity (2) extraction area 42 (FIG. 7). When the target pixels are present within the characteristic quantity (2) extraction area 42, a step S53 is executed to check if the target pixels are the ON pixels.

When the target pixels are the ON pixels in the step S53, a step S54 is executed to count them and then a step S55 is executed. When the step S52 judges that the target pixels are present within a characteristic quantity (2) extraction area 42 (FIG. 7), or when the step S53 judges that the target pixels are not the ON pixels, a step S55 is executed. The step S55 judges whether or not the scanning of the cut-out image area ends. When the scanning does not end yet, a step S56 is executed to scan the subsequent pixels, and a sequence of the process from the steps S52 to S55 is repeated. When the step S55 judges that the scanning of the cut-out image area is completed, a step S57 is executed to output a count value, and the process under execution ends.

Figure 16:
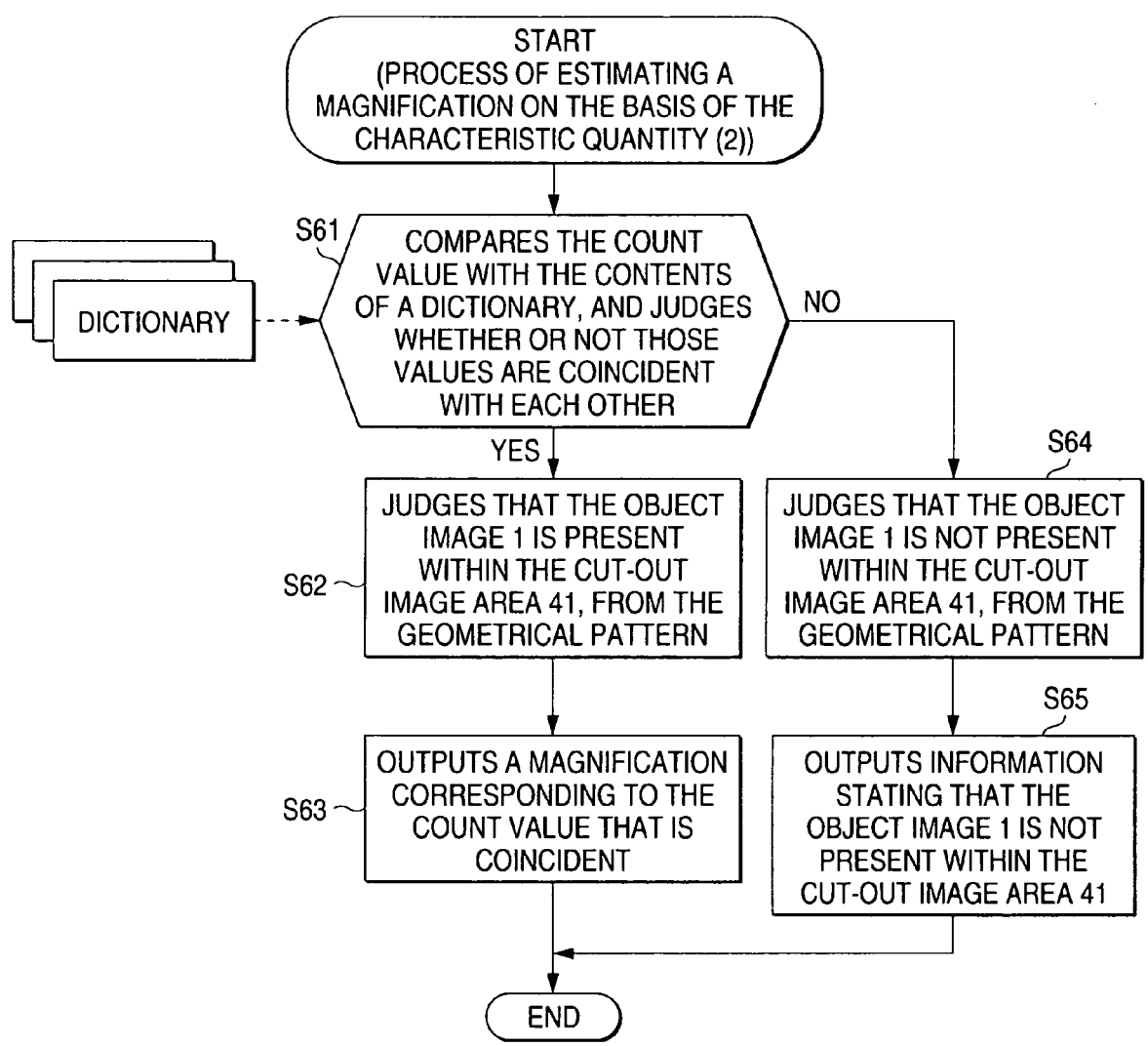
FIG. 16 is a flow chart showing a for estimating a magnification on the basis of the characteristic quantity (2).

A process, which is executed in the step S7, for estimating a magnification on the basis of the characteristic quantity (2) extracted in the step S6, will now be described with reference to a flow chart in FIG. 16. An operation of estimating a magnification on the basis of the characteristic quantity (2) starts. In turn, a step S61 is executed to compare the number of ON pixels in the characteristic quantity (2) extraction area, extracted in the step S6, with the values in a dictionary as shown in FIG. 8, and judges whether or not those values are coincident with each other.

When those are coincident, a step S62 is executed to judge that the object image 1 is present within the cut-out image area, from the geometrical pattern of the object image 1. A step S63 is executed to output a magnification corresponding to the number of ON pixels, which is coincident in the step S62, and the process under execution ends. When the number of ON pixels in the characteristic quantity (2) extraction area, extracted in the step S6 is not coincident with any of the values in the dictionary as shown in FIG. 8, a step S64 is executed to judge that the object image 1 is not present within the cut-out image area, from the geometrical pattern of the object image 1, and a step S65 is executed to output information stating that the image within the cut-out image area is not the object image 1, and the process under execution ends.

Figure 17:
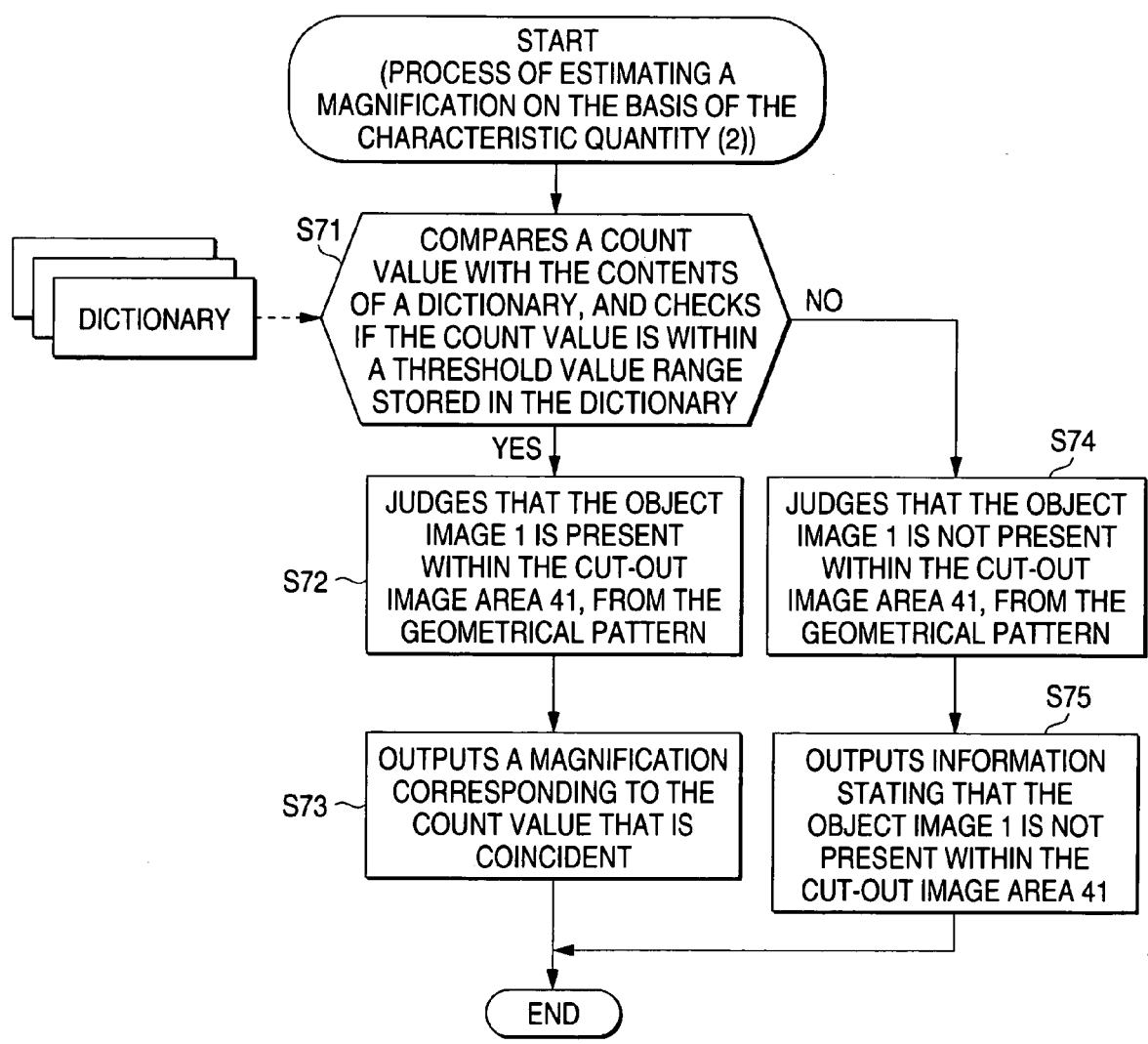
FIG. 17 is a flow chart showing a process for estimating a magnification on the basis of the characteristic quantity (2).

A process for estimating a magnification on the basis of the characteristic quantity (2), which is executed in the step S7 in FIG. 12, may be constructed as in a flow chart shown in FIG. 17. An operation of estimating a magnification on the basis of the characteristic quantity (2) starts. A step S71 is executed. This step compares the number of ON pixels in the characteristic quantity (2) extraction area, extracted in the step S6, with the contents of a dictionary containing the upper and lower limits of the number of ON pixels in the object image 1, which corresponds to magnification levels in the characteristic quantity (2) extraction area 42. The step S71 judges whether or not a count value is within a threshold value range stored in the dictionary. If it is within the threshold value range, a step S72 is executed to judge that the object image 1 is present within the cut-out image area, from the geometrical pattern of the object image 1, and then a step S73 is executed to output a magnification level corresponding to the threshold value within which the count value falls, and the process under execution ends.

When in the step S71, the number of the ON pixels in the characteristic quantity (2) extraction area, extracted in the step S6, is out of the threshold value range stored in the dictionary, a step S74 is executed to judge that the object image 1 is not present within the cut-out image area, from the geometric pattern of the object image 1, and a step S75 is executed. This step outputs information stating that the object image 1 is not present within the cut-out image area 41, and the process under execution ends.

Figure 18:
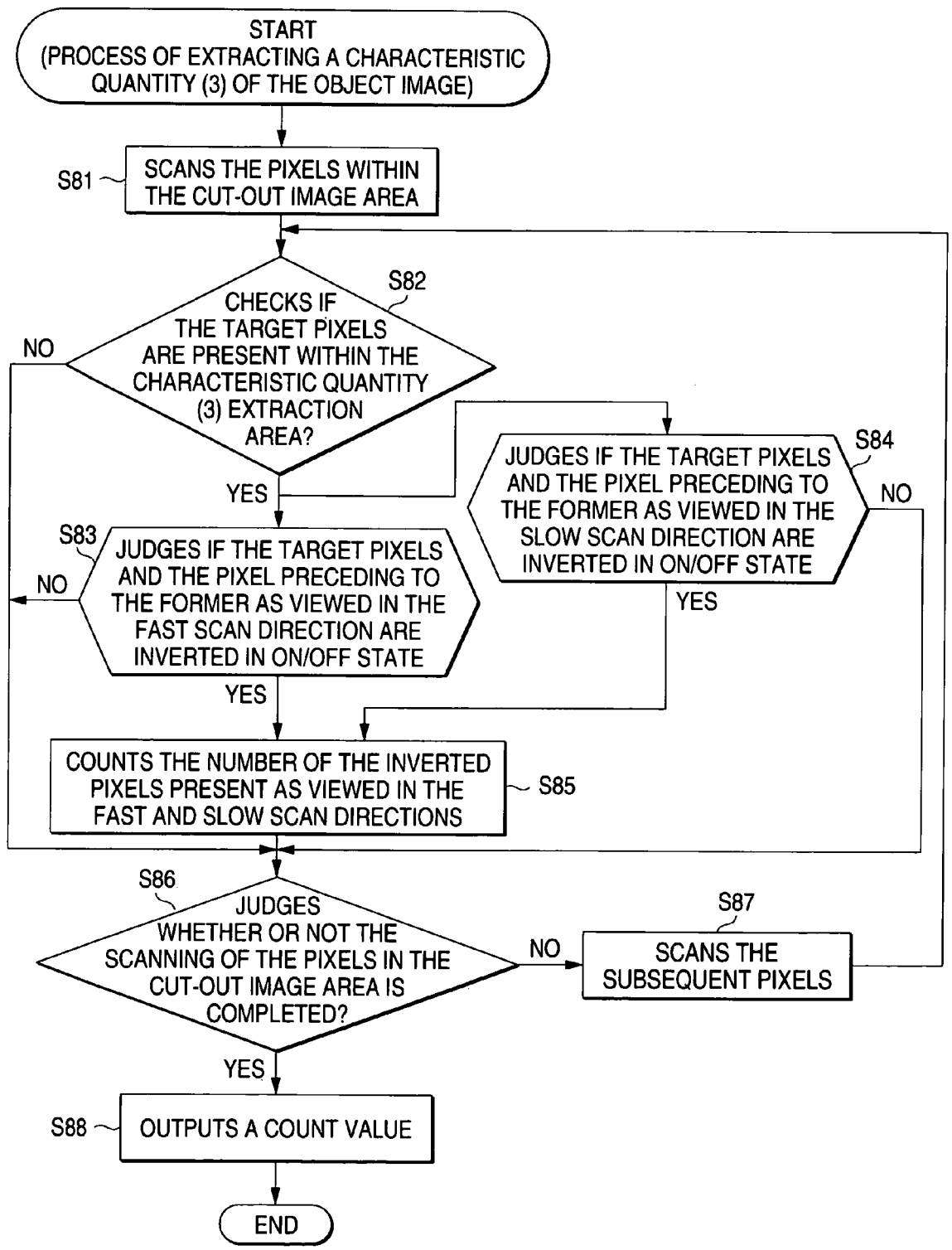
FIG. 18 is a flow chart showing a process for extracting the characteristic quantity (3).

A process, executed in the step S8 (FIG. 12), for extracting the characteristic quantity (3) within the cut-out image area cut out in the step S3 is a flow chart in FIG. 18. An operation of extracting the characteristic quantity (3) starts. A step S81 is executed to scan the pixels within the cut-out image area. A step S82 is then executed to check if the target pixels to be scanned are present within the characteristic quantity (3) extraction area. When the target pixels to be scanned are present within the characteristic quantity (3) extraction area, a step S83 is executed to judge if the target pixels and the pixel preceding to the former as viewed in the fast scan direction are inverted in ON/OFF state.

When the step S83 judges that the target pixels and the pixel preceding to the former as viewed in the fast scan direction are inverted, a step S85 is executed. Similarly, when the target pixels are present within the characteristic quantity (3) extraction area in the step S82, a step S84 judges if the target pixels and the pixel preceding to the former as viewed in the slow scan direction are inverted in ON/OFF state.

When the step S84 judges that the target pixels and the pixel preceding to the former as viewed in the slow scan direction are inverted, a step S85 is executed. The step S85 counts the number of the inverted pixels present as viewed in the fast and slow scan directions. When the step S82 judges that the target pixels are not present within the characteristic quantity (3) extraction area or when the steps S83 and S84 judge that the target pixels and the pixels preceding to the former as viewed in the fast and slow scan directions are not inverted in ON/OFF state, a step S86 is executed.

The step S86 judges whether or not the scanning for the cut-out image area is completed. When not completed, a step S87 is executed to scan the subsequent pixels. A sequence of the process from the steps S82 to S86 is repeated. When the step S86 judges that the scanning of the cut-out image area is completed, a step S88 outputs a count value and the process under execution ends.

A process of the step S9 for estimating a magnification on the basis of the characteristic quantity (3) resembles the process of the step S7 for estimating a magnification on the basis of the characteristic quantity (2). Hence, description of the step S9 process is omitted.

Figure 19:
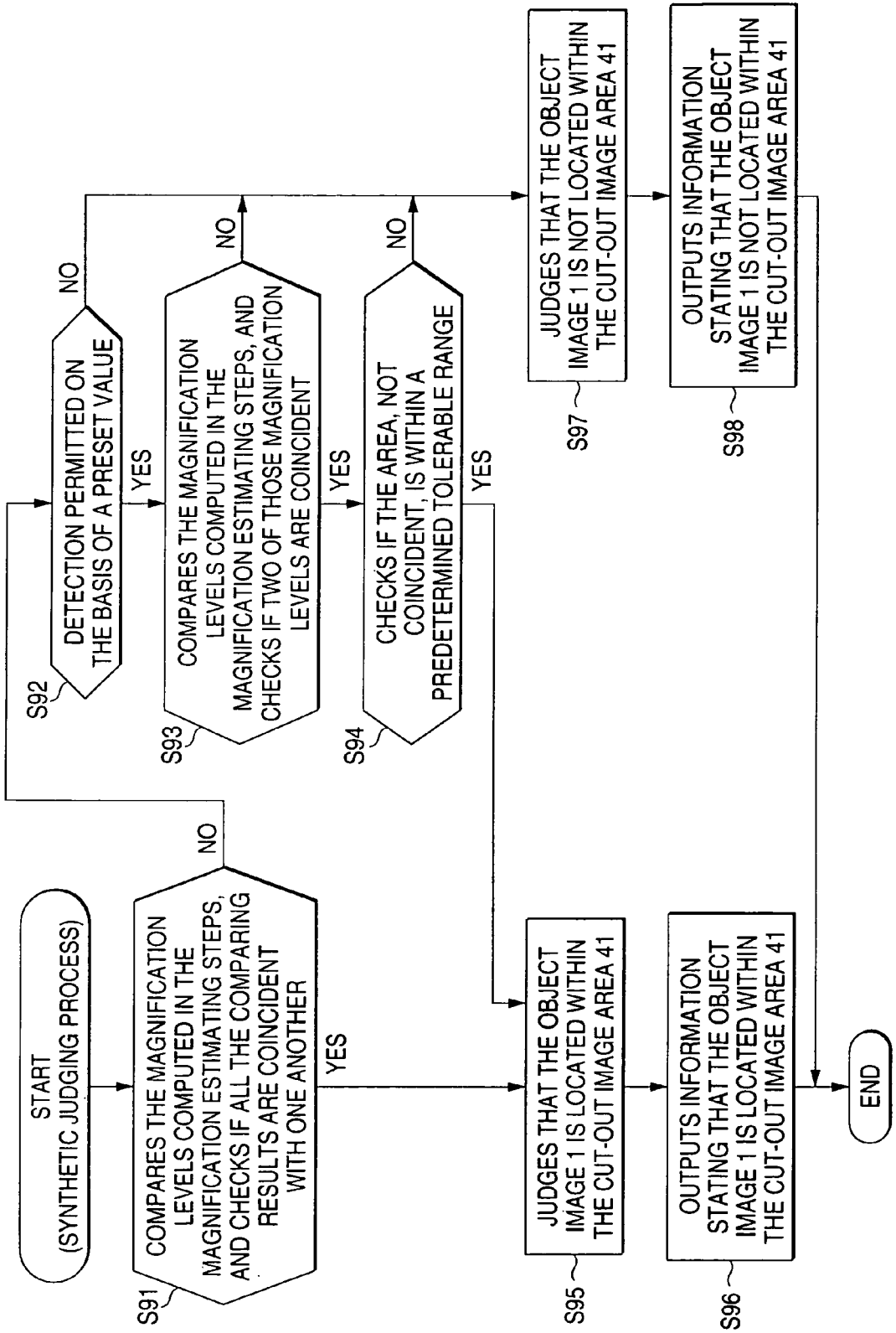
FIG. 19 is a flow chart showing a synthetic judging process.

A flow chart showing a synthetic judging process of a step S10 in FIG. 12 is shown in FIG. 19. The synthetic judging process starts. Then, a step S91 compares the magnification levels computed in the magnification estimating steps S5, S7 and S9 for the characteristic quantities (1) to (3). When all the comparing results are coincident with one another, a step S91 is executed. In other cases, a step S92 is executed.

When a detection is permitted on the basis of a preset value in the step S92, a step S93 is executed to compare the magnification levels computed in the magnification estimating steps S5, S7 and S9 for the characteristic quantities (1) to (3). When those are coincident with one another, a step S94 is executed to check if the area, not coincident, is within a predetermined error tolerable range. If it is within the tolerable error range, a step S95 is executed. In other cases, a step S97 is executed to judge that the image within the cut-out image area 41 is not the object image 1, and a step S98 is executed to output information stating that the image within the cut-out image area 41 is not the object image 1, and the process under execution ends.

The step S95 judges that the image within the cut-out image area 41 is the object image 1, and the step S96 outputs information stating that the image within the cut-out image area 41 is the object image 1, and the process ends.

Figure 20:
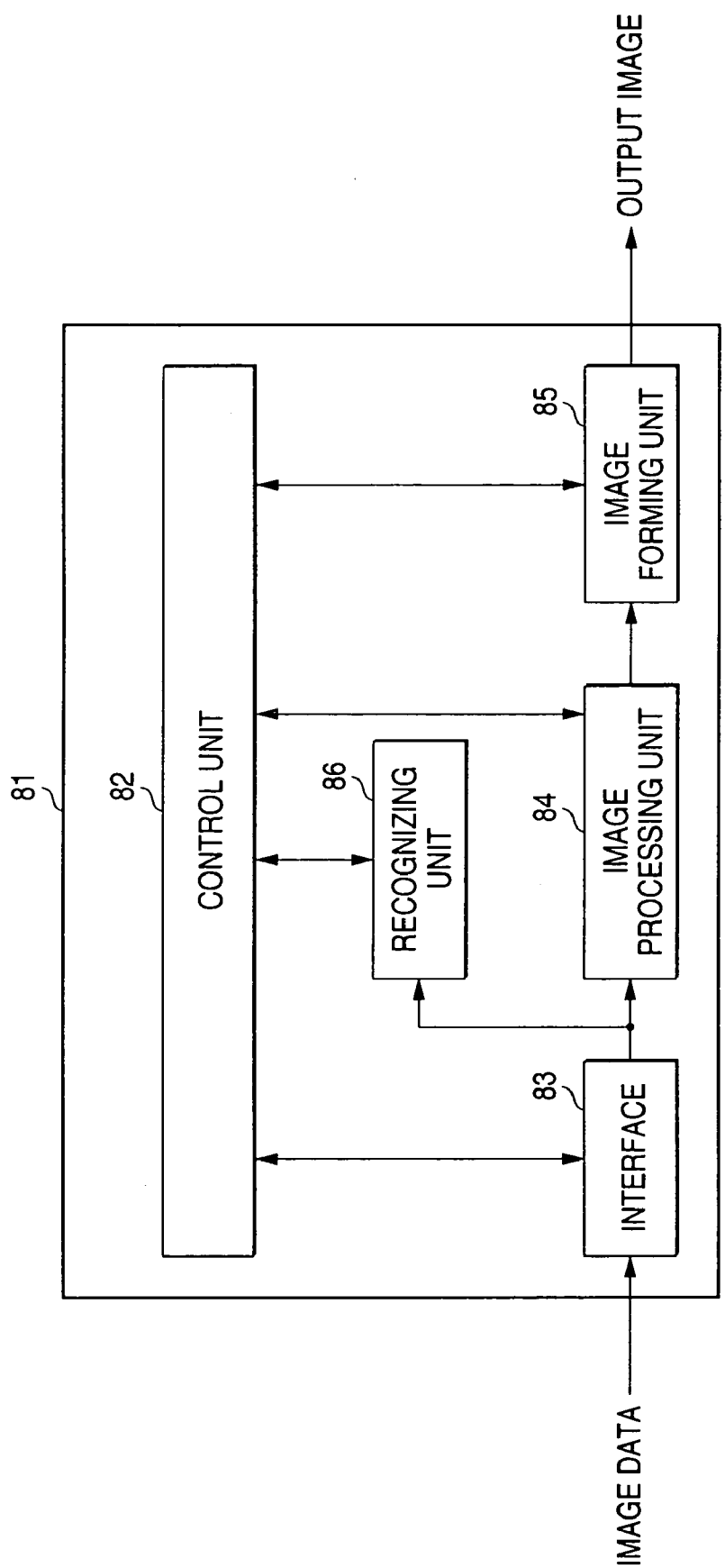
FIG. 20 is a block diagram showing an image forming apparatus which is an embodiment of the present invention.
Figure 21:
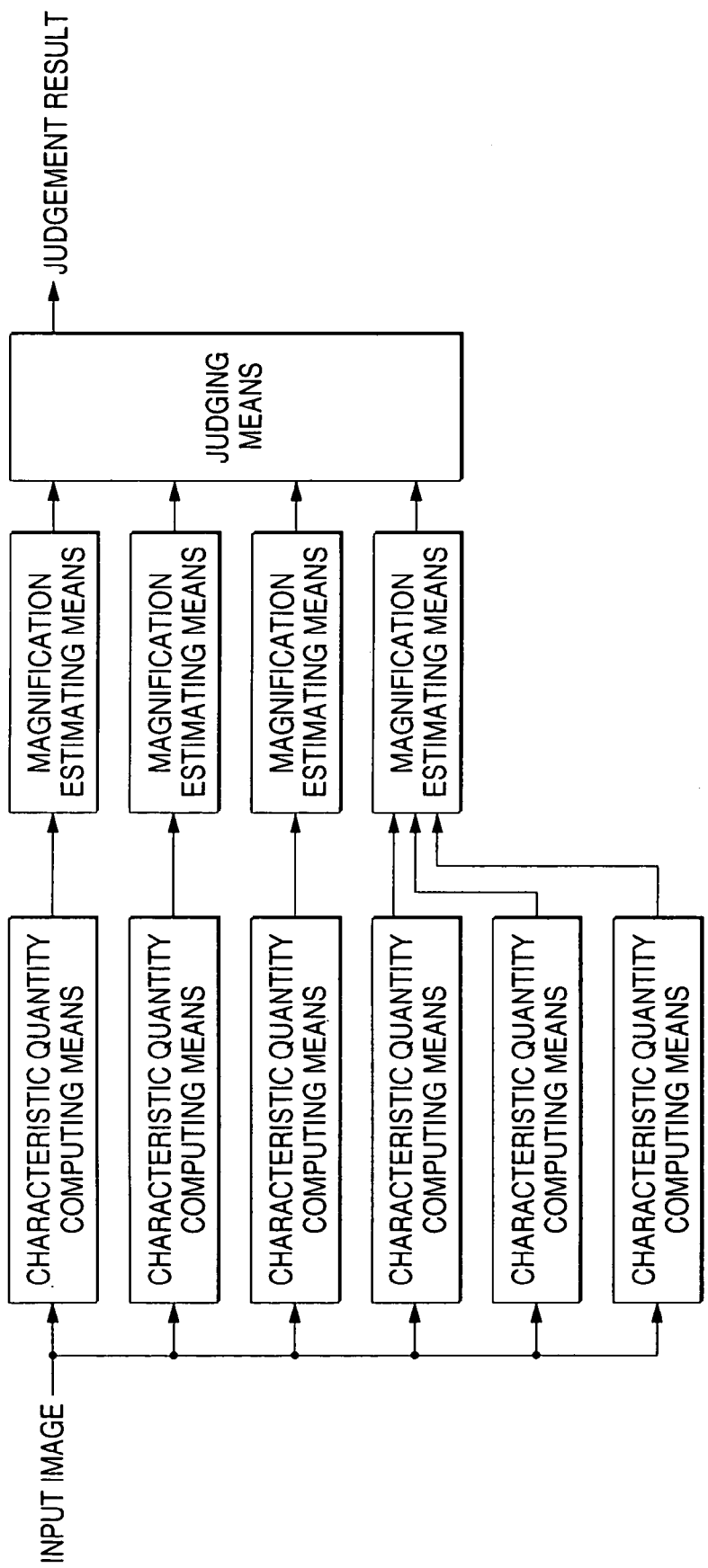
FIG. 21 is a block diagram showing an overall arrangement of the image forming apparatus.
Figure 22:
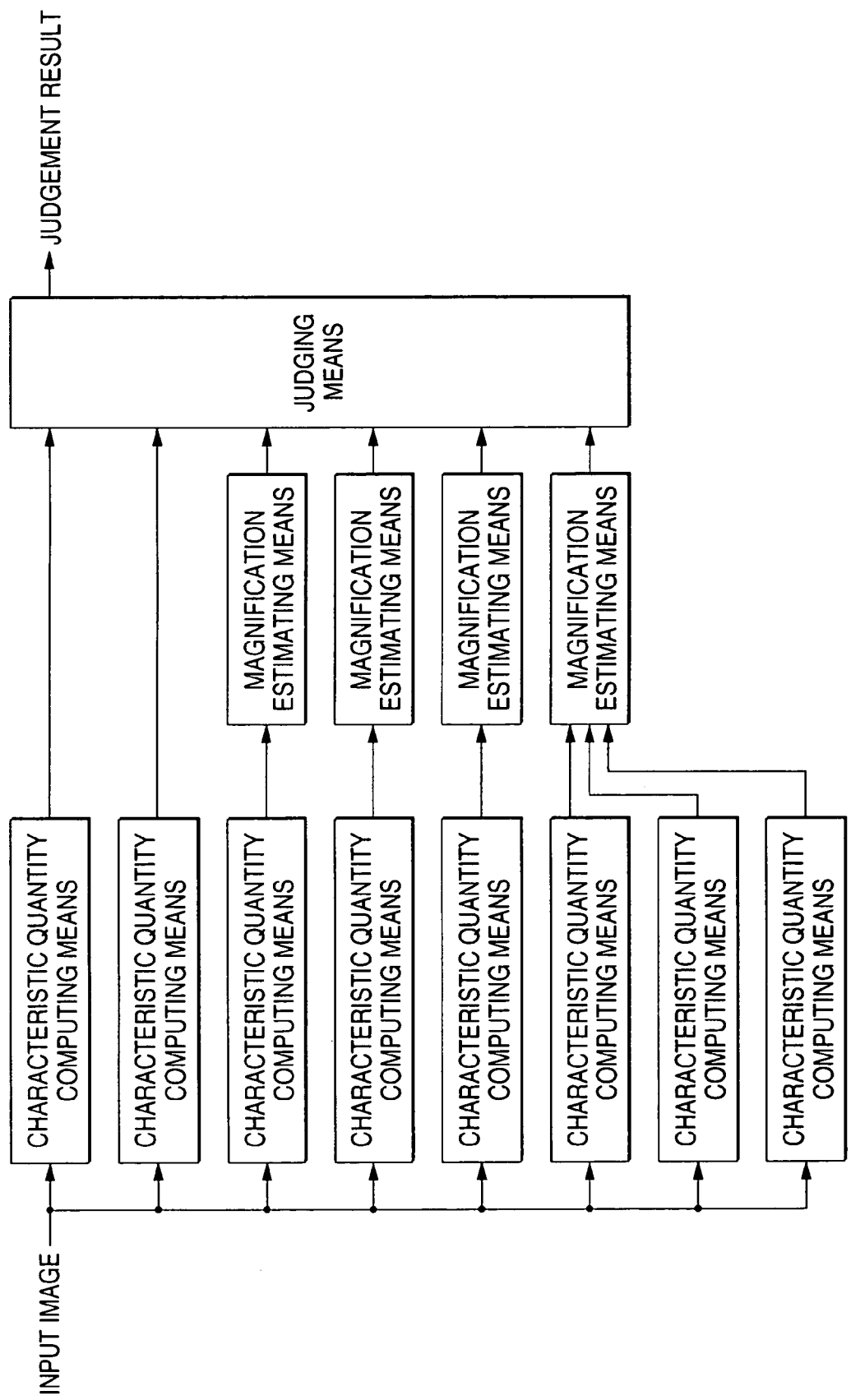
FIG. 22 is a block diagram showing another overall arrangement of the image forming apparatus.

FIG. 20 is a block diagram showing an image forming apparatus which is an embodiment of the present invention. In the figure, reference numeral 81 is an image forming apparatus; 82 is a control unit; 83 is an interface; 84 is an image processing unit; 85 is an image forming unit; and 86 is a recognizing unit.

The control unit 82 controls the relative portions for forming an image on a recording medium in accordance with input image data. In particular when the recognizing unit 86 judges that an object image is contained in the image data received by the interface 83, the control unit carries out a process of making the image data invalid.

The interface 83 receives image data from an external device, such as a personal computer. There is a possibility that an object image, which is inhibited from being visualized, is contained in the image data received. The image data may be the image data of a magnified original image.

The image processing unit 84 carries out a variety of processes for image formation. There is a case that no image processing is required in the image forming apparatus, for example, it receives image data having variously been processed in the external device. In this case, the image processing unit 84 may be omitted.

The image forming unit 85 forms an image on a recording medium. An appropriate method may be used for forming the image. When receiving an invalidating instruction from the control unit 82, it forms an image in accordance with the instruction.

The recognizing unit 86 may employ the above-mentioned unique construction. Specifically, the recognizing unit 86 judges whether or not an object image is present in input image data, and outputs the resultant data to the control unit 82. In this case, even when the input image data has been magnified, the object image can be detected as described above.

An operation of the thus arranged image forming apparatus will be described. The interface 83 receives image data from an external device, such as a personal computer. The image processing unit 84 processes the image data in a predetermined manner. Then, the image forming unit 85 forms an image on a recording medium. In the operation, the interface 83, the image processing unit 84 and the image forming unit 85 are under control by the control unit 82.

The image data that is received by the interface 83 is also input to the recognizing unit 86. The recognizing unit 86 judges whether or not an object image is present in the input image data, and outputs the resultant data to the control unit 82.

When the recognizing unit 86 judges that the object image is present, the control unit 82 carries out a process of making the input image data invalid. An example of the invalidating process is to generate given data to paint out the whole output image with a predetermined color, and the image forming unit 85 forms an image of the generated data. In an alternative, the recognizing unit 86 prohibits the image forming unit 85 from generating the received image data, thereby prohibiting the image formation.

Thus, the image data containing the object image may be controlled so that it is directly used for image formation. In this case, if the image data has been magnified, the magnified image data can reliably be recognized by applying the image processing system of the invention to the recognizing unit 86, and the invalidating process may be carried out.

As seen from the foregoing description, an object image of a specific pattern, even if magnified, can be reliably detected. Even when the magnified image data is received, the image forming apparatus of the invention recognizes it and carries out the invalidating process.

What is claimed is:

1. An image processing system for processing an input image containing an object image with a predetermined pattern which may have been magnified, said image processing system comprising:

characteristic quantity computing unit that computes a plurality of characteristic quantities of said object image, wherein said plurality of characteristic quantities include pixel information representing the predetermined pattern of said object image, said pixel information includes ON pixel information and ON/OFF inverse information, said ON pixel information includes the number of ON pixels, and said ON/OFF inverse information includes ON and OFF inverse pixels;

a plurality of magnification estimating units that estimate a plurality of magnification levels on the basis of said plurality of characteristic quantities computed by and output from said characteristic quantity computing unit; and judging unit that judges whether or not said object image is present in said input image, on the basis of whether or not the plurality of magnification levels estimated by said plurality of magnification estimating units are coincident with one another.

2. The image processing system according to claim 1, wherein said plurality of magnification estimating units estimate said plurality of magnification levels in consideration of an error or errors of said plurality of characteristic quantities computed by said characteristic quantity computing unit.

3. The image processing system according to claim 1, wherein said judging unit synthetically judges whether or not said object image is present in said input image in consideration with an error or errors of said plurality of magnification levels estimated by said plurality of magnification estimating units.

4. The image processing system according to claim 1, wherein said judging unit judges whether or not said object image is present in said input image, from said plurality of characteristic quantities computed by said characteristic quantity computing unit and said plurality of magnification levels estimated by said plurality of magnification estimating units.

5. The image processing system according to claim 1, wherein said judging unit judges whether or not said object image is present in said input image, from said plurality of characteristic quantities computed by said characteristic quantity computing unit and an error or errors of said plurality of magnification levels estimated by said plurality of magnification estimating units.

6. The image processing system according to claim 1, further comprising:

specific color extracting unit that extracts a specific color from said input image, said specific color extracting unit being located at a pre-stage of said characteristic quantity computing unit.

7. The image processing system according to claim 1, further comprising:
resolution converting unit that converts a resolution of said input image into another resolution, said resolution converting unit being located at a pre-stage of said characteristic quantity computing unit.

8. The image processing system according to claim 1, further comprising:
window processing unit that sequentially cuts predetermined image areas out of said input image, said window processing unit being located at a pre-stage of said characteristic quantity computing unit.

9. An image forming apparatus comprising:
interface unit that receives an image which may have been magnified, from an external device;
image forming unit that forms an image on the basis of the image data received by said interface unit,
recognizing unit that judges whether or not an object image is present in said input image; and
control unit that controls an overall of said image forming apparatus, when said recognizing unit judges that said object image is contained in said image data received by said interface unit, said control unit making image data invalid; wherein
said recognizing unit includes said image processing system defined in claim 1.

10. The image forming apparatus according to claim 9, wherein
said control unit performs said image invalidating process such that said control unit causes said image forming unit to form an image on the bases of predetermined image data and the image data received by said interface unit.

11. The image forming apparatus according to claim 9, wherein
said control unit performs said image invalidating process such that said control unit inhibits the formation of said received image data.

12. A method of processing an input image containing an object image with a predetermined pattern which may have been magnified,
said image processing method comprising the steps of:
computing a plurality of characteristic quantities of said object image, wherein said plurality of characteristic quantities include pixel information representing the predetermined pattern of said object image, said pixel information includes ON pixel information and ON/OFF inverse information, said ON pixel information includes the number of ON pixels, and said ON/OFF inverse information includes ON and OFF inverse pixels;
estimating a plurality of magnification levels on the basis of said plurality of characteristic quantities computed by said characteristic quantity computing step; and
judging whether or not said object image is presented in said input image, on the basis of whether or not the plurality of magnification levels estimated by said magnification estimating step are coincident with one another.

13. The image processing method according to claim 12, wherein,
said magnification estimating step estimating said plurality of magnification levels in consideration of an error or errors of said plurality of characteristic quantities computed by said characteristic quantity computing step.

14. The image processing method according to claim 12, wherein
said judging step synthetically judges whether or not said object image is present in said input image, in consideration of an error or errors of said plurality of magnification levels estimated by said magnification estimating step.

15. The image processing method according to claim 12, wherein
said judging step judges whether or not said object image is present in said input image, from said plurality of characteristic quantities computed by said characteristic quantity computing step and said plurality of magnification levels estimated by said magnification estimating step.

16. The image processing method according to claim 12, wherein
said judging step synthetically judges whether or not said object image is present in said input image, in consideration of said plurality of characteristic quantities computed by said characteristic quantity computing step and said plurality of magnification levels estimated by said magnification estimating step.

17. The image processing method according to claim 12, further comprising:
a step for extracting a specific color from said input image, said specific color extracting step being performed before said characteristic quantity computing step is performed.

18. The image processing method according to any of claims 12, 13, 14, 15 and 16, further comprising:
a resolution converting step for converting a resolution of said input image into another resolution, said resolution converting step being performed before said characteristic quantity computing step is performed.

19. The image processing method according to claim 12, further comprising:
a window processing step for sequentially cutting predetermined image areas out of said input image, said window processing step being performed before said characteristic quantity computing step is performed.

20. An image processing system for processing an input image containing an object image with a predetermined pattern which may have been magnified,
said image processing system comprising:
characteristic quantity computing unit that computes a plurality of characteristic quantities of said object image, wherein said plurality of characteristic quantities include pixel information representing the predetermined pattern of said object image, said pixel information includes ON pixel information and ON/OFF inverse information, said ON pixel information includes the number of ON pixels, and said ON/OFF inverse information includes ON and OFF inverse pixels; and
a plurality of magnification estimating units that estimate a plurality of magnification levels on the basis of said plurality of characteristic quantities computed by and output from said characteristic quantity computing unit.

* * * * *